US 8,077,355 B2

(12) United States Patent
Guo et al.

(10) Patent No.: US 8,077,355 B2
(45) Date of Patent: Dec. 13, 2011

(54) DIGITAL HALFTONING METHOD UTILIZING DIFFUSED WEIGHTING AND CLASS MATRIX OPTIMIZATION

(75) Inventors: Jing-ming Guo, Taipei (TW); Yun-fu Liu, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 680 days.

(21) Appl. No.: 12/187,546

(22) Filed: Aug. 7, 2008

(65) Prior Publication Data
US 2010/0033764 A1 Feb. 11, 2010

(51) Int. Cl.
*G06K 15/00* (2006.01)
(52) U.S. Cl. ............. 358/3.03; 358/3.04; 358/3.01; 358/1.9; 382/100
(58) Field of Classification Search ............... 358/3.03, 358/3.04, 3.01, 1.9; 382/100
See application file for complete search history.

(56) References Cited

U.S. PATENT DOCUMENTS

| 6,563,957 B1 * | 5/2003 | Li et al. .............. 382/252 |
| 2006/0034483 A1 * | 2/2006 | Au et al. ............... 382/100 |
| 2007/0121165 A1 * | 5/2007 | Ando et al. ............ 358/3.01 |

OTHER PUBLICATIONS

Improved Dot Diffusion Using Optimized Diffused Weighting and Class Matrix.

* cited by examiner

*Primary Examiner* — Twyler Haskins
*Assistant Examiner* — Michael Burleson
(74) *Attorney, Agent, or Firm* — Kirton & McConkie; Evan R. Witt

(57) ABSTRACT

The present invention discloses a digital halftoning method. The method comprises steps of: (a1) dividing an original image into non-overlapping blocks; (a2) obtaining a Least-Mean-Square trained (LMS-trained) filter by comparing at least a training image and a halftone result corresponding to the training image (a3) optimizing a class matrix with the LMS-trained filter, which involves the diffused area and the diffused weightings; and (a4) processing the non-overlapping blocks by performing a dot diffusion procedure with the optimized class matrix and the diffused weightings to generate a halftone image corresponding to the original image. A detailed class matrix optimizing method as in the above-mentioned step (a3) is also disclosed.

17 Claims, 10 Drawing Sheets

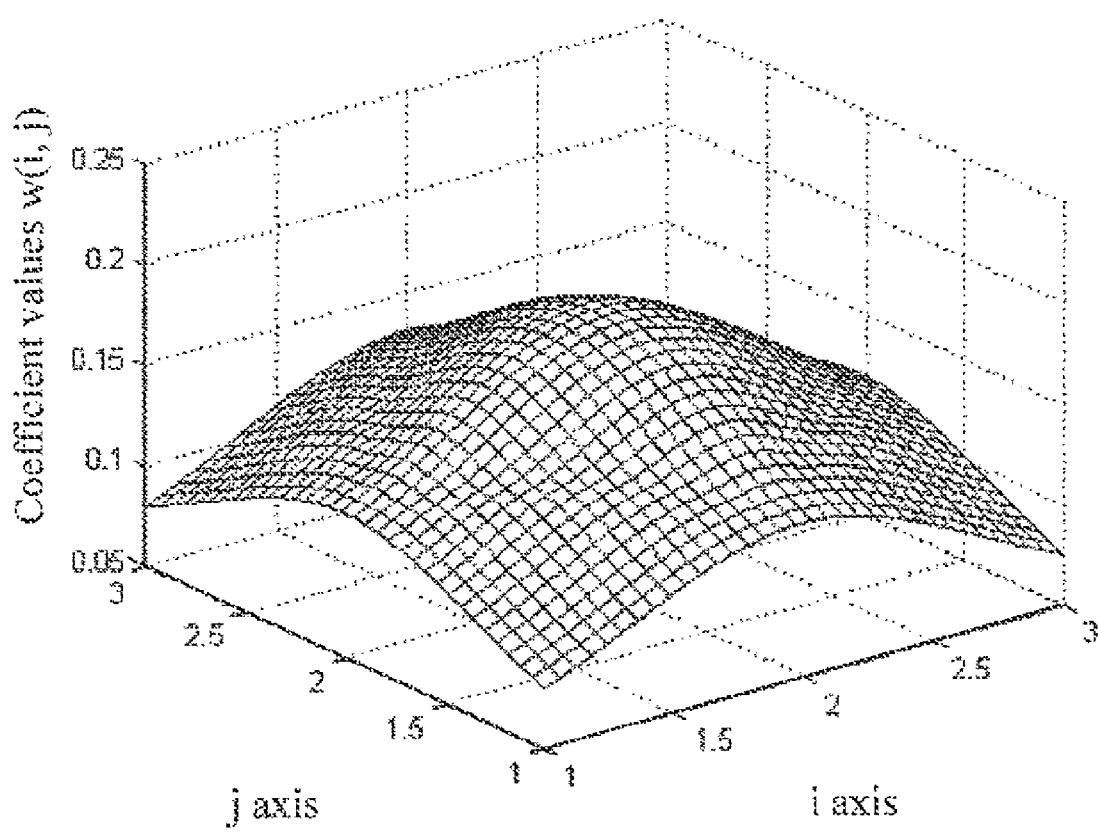
FIG. 5a (3x3)

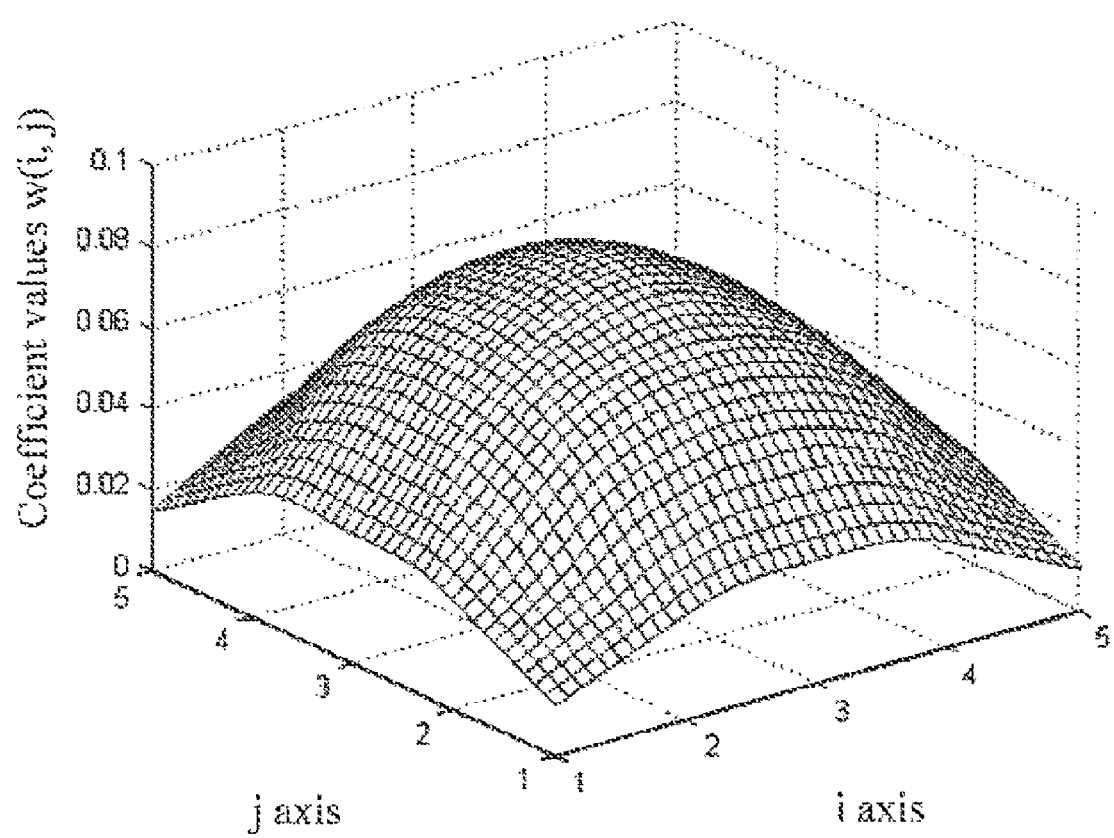
FIG. 5b (5x5)

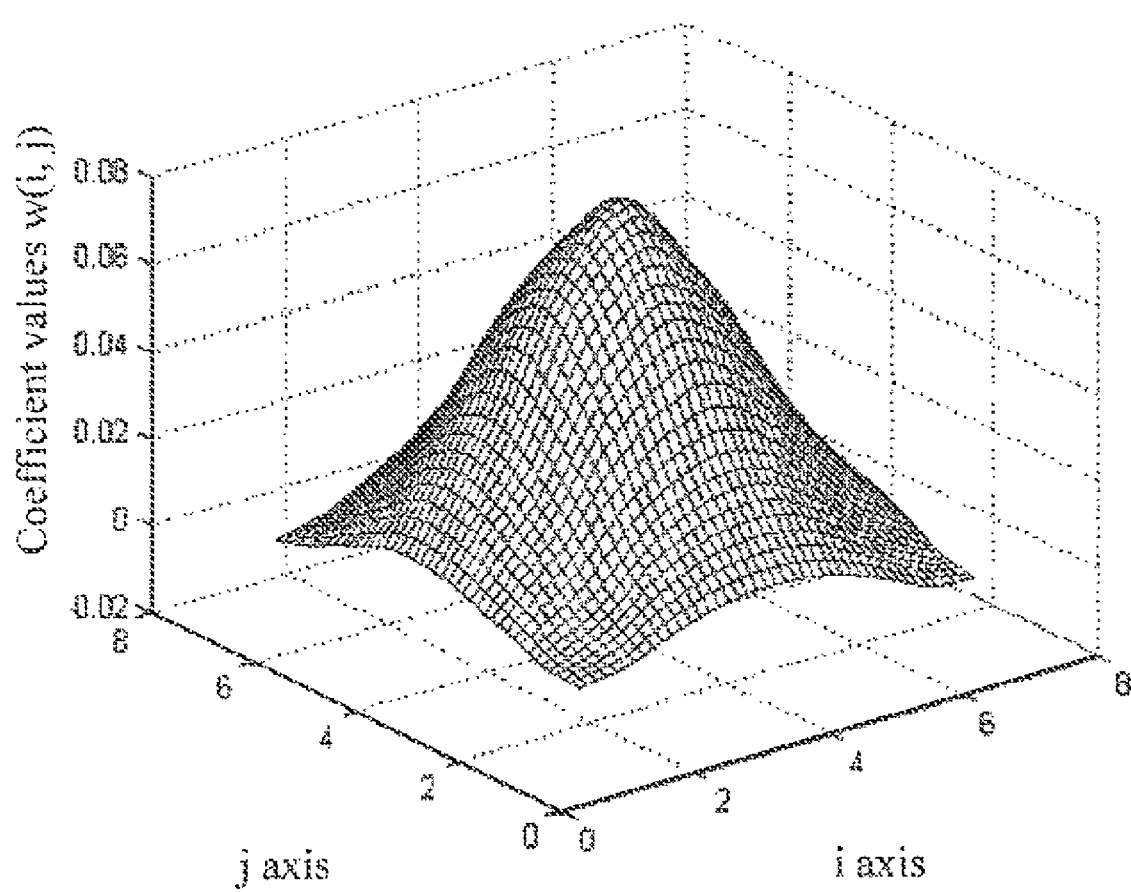
FIG. 5c (7x7)

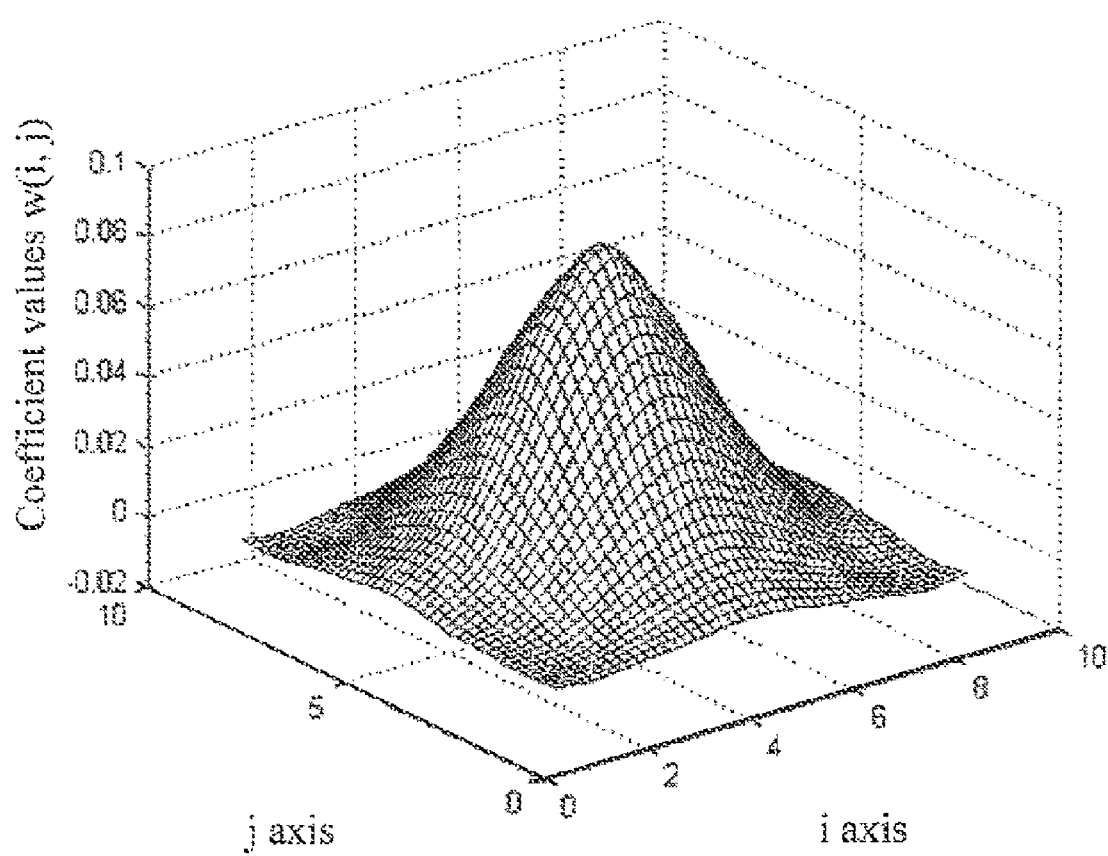
FIG. 5d (9x9)

DIGITAL HALFTONING METHOD UTILIZING DIFFUSED WEIGHTING AND CLASS MATRIX OPTIMIZATION

This invention is disclosed by an published article, Jing-Ming Guo and Yun-Fu Liu, "IMPROVED DOT DIFFUSION USING OPTIMIZED DIFFUSED WEIGHTING AND CLASS MATRIX," pp. 1117-1120, IEEE International Conference on Acoustics, Speech and Signal Processing, 2008 (ICASSP 2008), March 31.

TECHNICAL FIELD OF THE INVENTION

The present invention relates to a halftoning method for printing applications, and more particularly, to a halftoning method utilizing dot diffusion.

BACKGROUND OF THE INVENTION

Digital halftoning is a printing technique widely used to print computer printer-outs, printed books, newspapers and magazines, for example. When printing these materials, original images are changed into halftone images at first. These halftone images can be taken as the original images when viewing from a distance by lowpass filtering in human visual system (HVS). There are various kinds of halftoning methods, including ordered dithering, dot diffusion, error diffusion, direct binary search (DBS) and so on.

The ordered dithering is a parallel processing method, and is generally distinguished into clustered-dot and dispersed-dot halftone screens. The image quality of the ordered dithering is inferior to the DBS, error diffusion, as well as the dot diffusion, since the error induced during the halftoning procedure is retained in each halftone pixel. The image quality of the ordered dithering is worse so that it is hard to be accepted by human beings. Conversely, the error diffusion does not have the above-mentioned problem, because the quantized error is compensated by the neighborhood pixels. However, the error diffusion was born of lacking parallel processing advantage. Hence, the processing efficiency of the error diffusion is much inferior to the ordered dithering. For the time being, the DBS is the most powerful halftoning in the view of image quality. However, the time-consuming iteration-based approach of the DBS makes it difficult to be realized in commercial printing devices, for example, laser printers or inkjet printers.

Among those methods, the dot diffusion is accommodated image quality and processing efficiency. The dot diffusion inherently has the parallel processing benefit by cooperating with the so-called class matrix. So far, the dot diffusion methods proposed by Knuth and Mese are the two most well-known conventional methods. Their researches related to the dot diffusion are focused on class matrix optimization. In the following paragraphs, it will be described the concept of the dot diffusion and the major differences and weaknesses of the two conventional dot diffusion methods.

For an original grayscale image of size P×Q, it is divided into non-overlapping blocks of size M×N. An important media called class matrix, which is of the same size as a divided block, is employed to determine the processing order in a block. Please refer to FIG. 1, which shows a flow chart of the dot diffusion method. Here a white pixel is defined as 255 and a black pixel as 0. The variable $x_{i,j}$ denotes a grayscale value of a pixel as an input and $x'_{i,j}$ is the diffused error accumulated from the neighboring processed pixels. The variable $b_{i,j}$ represents a binary output at position (i,j) and $v_{i,j}$ is the modified gray output. The variable $e_{i,j}$ denotes the difference between the modified gray output $v_{i,j}$ and binary output $b_{i,j}$, and the relationships of $v_{i,j}$, $b_{i,j}$ and $e_{i,j}$ are represented as below:

$$v_{i,j} = x_{i,j} + x'_{i,j}, \text{ where } x'_{i,j} = \sum_{m=-1}^{1}\sum_{n=-1}^{1} \frac{e_{i+m,j+n} \times h_{m,n}}{\text{sum}} \quad (1)$$

$$e_{i,j} = v_{i,j} - b_{i,j}, \text{ where } b_{i,j} = \begin{cases} 0, & \text{if } v_{i,j} < 128 \\ 255, & \text{if } v_{i,j} \geq 128 \end{cases}, \quad (2)$$

where the variable $h_{m,n}$ is a diffused weighting. The diffused weightings appearing in Knuth's and Mese's methods are shown in Table 1. A notation x denotes the current processing pixel, and the integers in the eight-neighbor connections are diffused proportions, i.e. the diffused weightings. Since the neighbors in vertical and horizontal orientations are closer to the center, the weightings are greater than those at diagonal orientations.

TABLE 1

| 1 | 2 | 1 |
|---|---|---|
| 2 | x | 2 |
| 1 | 2 | 1 |

Note that, the error can only diffuse to neighbor pixels that have not binarized yet, which associates to the members in the class matrix with higher value. The variable $$\text{sum} = \sum_{m=-1}^{1}\sum_{n=-1}^{1} h_{m,n}$$

is the summation of the diffused weighings corresponding to those unprocessed pixels. An example shown in FIG. 2 demonstrates the concepts introduced above, where the Knuth's class matrix shown in Table 2 is adopted for reference. For example, a member value 0 can diffuse to 3, 4, 6, 8, 12, 16, 20 and 24, and a member value 7 can diffuse to 10, 15, 18, 23, 31. The values of sum associate to the member values 0 and 7 in the class matrix are 12 and 7, respectively.

TABLE 2

| 34 | 48 | 40 | 32 | 29 | 15 | 23 | 31 |
|----|----|----|----|----|----|----|----|
| 42 | 58 | 56 | 53 | 21 | 5  | 7  | 10 |
| 50 | 62 | 61 | 45 | 13 | 1  | 2  | 18 |
| 38 | 46 | 54 | 37 | 25 | 17 | 9  | 26 |
| 28 | 14 | 22 | 30 | 35 | 49 | 41 | 33 |
| 20 | 4  | 6  | 11 | 43 | 59 | 57 | 52 |
| 12 | 0  | 3  | 19 | 51 | 63 | 60 | 44 |
| 24 | 16 | 8  | 27 | 39 | 47 | 55 | 36 |

The parallel property of the dot diffusion can be appreciated also from FIG. 2, where the pixels associate to the same value in the class matrix can be processed at the same time, i.e. parallel processing. For example, suppose the class matrix is of size 8×8, a dot diffused image can be obtained in 64 time units.

The processing orders within the class matrix have great influence to the reconstructed image quality. Knuth's optimization method tries to reduce the number of baron (pixel with no higher pixel value surrounded) and near-baron (pixel with only one higher pixel value surrounded) in the class matrix. The concept is straight-forward since the baron results in non-diffusible quantized error, and the near-baron only allows the quantized error diffuses in one way. However, the Knuth's method does not take the human visual system (HVS) into consideration. Therefore, it is uncomfortable to view the reconstructed images. For this, Mese's method adopts the following HVS equation into their optimization procedure to determine an optimized order within the class matrix. The shape of the equation in frequency domain is shown in FIG. 3, $$H(u, v) = aL^b \exp\left(-\frac{1}{s(\phi)} \frac{\sqrt{u^2+v^2}}{c \log(L) + d}\right),\qquad(3)$$

$$\text{where } s(\varphi) = \left[\frac{1-\text{sum}}{2}\right]\cos(4\varphi) + \left[\frac{1+\text{sum}}{2}\right].\qquad(4)$$

The variable a=131.6, b=0.318, c=0.525, d=3.91 and L=0.091 in Mese's work. In addition, the variable sum=0.7 and φ=arctan(u/v). During the optimization, the single tone 16 is employed to develop the final class matrix as shown in Table 3 (8×8) and Table 4 (16×16).

TABLE 3

(Mese's 8 × 8)

| 47 | 31 | 51 | 24 | 27 | 45 | 5  | 21 |
|----|----|----|----|----|----|----|----|
| 37 | 63 | 53 | 11 | 22 | 4  | 1  | 33 |
| 61 | 0  | 57 | 16 | 26 | 29 | 46 | 8  |
| 20 | 14 | 9  | 62 | 18 | 41 | 38 | 6  |
| 17 | 13 | 25 | 15 | 55 | 48 | 52 | 58 |
| 3  | 7  | 2  | 32 | 30 | 34 | 56 | 60 |
| 28 | 40 | 36 | 39 | 49 | 43 | 35 | 10 |
| 54 | 23 | 50 | 12 | 42 | 59 | 44 | 19 |

TABLE 4

(Mese's 16 × 16)

| 207 | 0   | 13  | 17  | 28  | 55  | 18  | 102 | 81  | 97  | 74  | 144 | 149 | 169 | 170 | 172 |
|-----|-----|-----|-----|-----|-----|-----|-----|-----|-----|-----|-----|-----|-----|-----|-----|
| 3   | 6   | 23  | 36  | 56  | 50  | 65  | 87  | 145 | 130 | 137 | 158 | 182 | 184 | 195 | 221 |
| 7   | 14  | 24  | 37  | 67  | 69  | 86  | 5   | 106 | 152 | 150 | 165 | 183 | 192 | 224 | 1   |
| 15  | 26  | 43  | 53  | 51  | 101 | 115 | 131 | 139 | 136 | 166 | 119 | 208 | 223 | 226 | 4   |
| 22  | 39  | 52  | 71  | 84  | 103 | 164 | 135 | 157 | 173 | 113 | 190 | 222 | 225 | 227 | 16  |
| 40  | 85  | 72  | 83  | 104 | 117 | 167 | 133 | 168 | 180 | 200 | 219 | 231 | 228 | 12  | 21  |
| 47  | 120 | 54  | 105 | 123 | 132 | 146 | 176 | 179 | 202 | 220 | 230 | 245 | 2   | 20  | 41  |
| 76  | 73  | 127 | 109 | 138 | 134 | 178 | 181 | 206 | 196 | 229 | 244 | 246 | 19  | 42  | 49  |
| 80  | 99  | 112 | 147 | 142 | 171 | 177 | 203 | 218 | 232 | 243 | 248 | 247 | 33  | 48  | 68  |
| 108 | 107 | 140 | 143 | 185 | 163 | 204 | 217 | 233 | 242 | 249 | 255 | 44  | 45  | 70  | 79  |
| 110 | 141 | 88  | 75  | 175 | 205 | 214 | 234 | 241 | 250 | 254 | 38  | 46  | 77  | 116 | 100 |
| 111 | 148 | 160 | 174 | 201 | 215 | 235 | 240 | 251 | 252 | 253 | 61  | 62  | 93  | 94  | 125 |
| 151 | 159 | 189 | 199 | 197 | 216 | 236 | 239 | 25  | 31  | 60  | 82  | 92  | 95  | 124 | 114 |
| 156 | 188 | 191 | 209 | 213 | 237 | 238 | 29  | 32  | 59  | 64  | 91  | 118 | 78  | 128 | 155 |
| 187 | 194 | 198 | 212 | 9   | 10  | 30  | 35  | 58  | 63  | 90  | 96  | 122 | 129 | 154 | 161 |
| 193 | 210 | 211 | 8   | 11  | 27  | 34  | 57  | 66  | 89  | 98  | 121 | 126 | 153 | 162 | 186 |

However, in Mese's method, the diffused weightings are not optimized. The reconstructed image quality is thus limited. Mese solely uses single tone of value 16 to optimize the class matrix. This causes the reconstructed class matrix difficult to perfectly render image regions with different tones.

Above all, the ordered dithering, error diffusion and DBS have drawbacks mentioned above. The dot diffusion, such as well-known conventional Knuth's and Mese's methods, still remains rooms for improving halftone image quality. Consequently, there is a need to develop a method for improving the reconstructed halftone image quality, at the same time, preserving the property of parallel processing.

SUMMARY OF THE INVENTION

To solve the foregoing drawbacks in the prior art, especially the conventional methods proposed by Knuth and Mese, an objective of the present invention is to provide a dot diffusion method to improve halftone image quality. The inherent parallel processing advantage of dot diffusion is preserved.

To achieve the aforesaid objective, the present invention provides a digital halftoning method. The method comprises steps of: (a1) dividing an original image into non-overlapping blocks; (a2) obtaining a Least-Mean-Square trained (LMS-trained) filter by comparing at least a training image and a halftone result corresponding to the training image, wherein size of the LMS-trained filter is taken as the diffused area and values inside the LMS-trained filter are taken as diffused weightings; (a3) optimizing a class matrix with the LMS-trained filter to obtain an optimized class matrix, that is to say the diffused area and the diffused weightings are employed; and (a4) processing the non-overlapping blocks by performing a dot diffusion procedure with the optimized class matrix from step (a3), and the diffused weightings to generate a halftone image corresponding to the original image.

In the optimizing step (a3), when optimizing the class matrix, one member of the class matrix is swapped with one of the other members. If the swapped class matrix leads to higher reconstructed image quality than the class matrix, the swapped class matrix is retained for next swapping. Conversely, If the class matrix leads to higher reconstructed image quality than the swapped class matrix, the class matrix is retained for next swapping. After a predetermined swapping order is terminated, an optimized class matrix is determined.

An example of the class matrix optimizing method of the present invention is also provided. The class matrix optimizing method comprises steps of (c1) selecting a member of the class matrix; (c2) swapping the selected member of the class matrix with one of the other members; (c3) performing a dot diffusion procedure with the class matrix to at least a testing image to obtain a first halftone testing image and performing the same dot diffusion procedure with the swapped class matrix obtained from the swapping step (c2) to the testing image to obtain a second halftone testing image; (c4) comparing a peak signal-to-noise ratio (PSNR) of the first halftone testing image and a PSNR of the second halftone testing image to obtain a comparing result; and (c5) determining an optimized class matrix according to the comparing result. After a series of swapping the members in the class matrix, the optimized class matrix is determined when no further swapping can leads to higher PSNR.

The halftone image quality utilized the digital halftoning method according to the present invention is close to some error diffusion and is even superior to the well-known Jarvis and Stucki error diffusion, and Mese's dot diffusion. Moreover, the inherent parallel processing advantage of dot diffusion is preserved. The digital halftoning method of the present invention provides much higher executing efficiency than DBS or error diffusion. A further detailed comparison will be described later for clearly revealing the advantages of the present invention.

BRIEF DESCRIPTION OF THE DRAWINGS

FIG. 5 is a diagram showing four LMS-trained filters of size (a)3×3, (b)5×5, (c)7×7 and (d)9×9 (in spatial domain) obtained in accordance with the present invention.

DETAILED DESCRIPTION OF THE INVENTION

Figure 1:
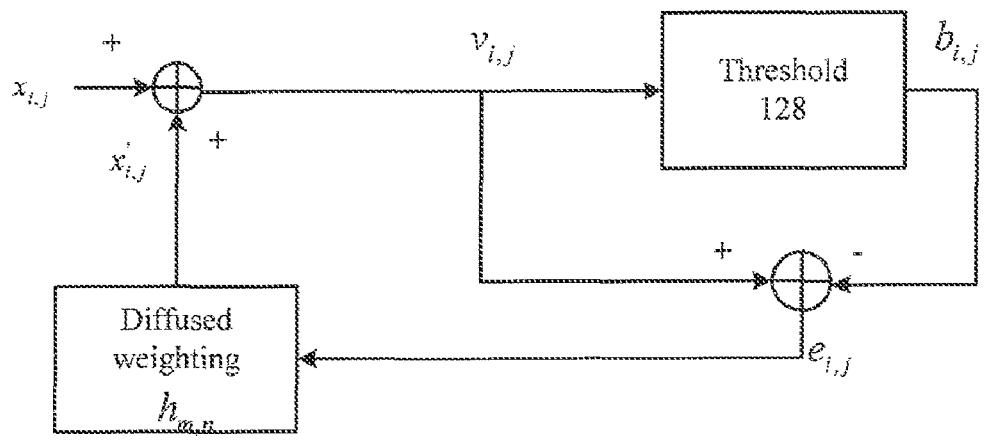
FIG. 1 is a flow chart illustrating dot diffusion in the prior art.
Figure 2:
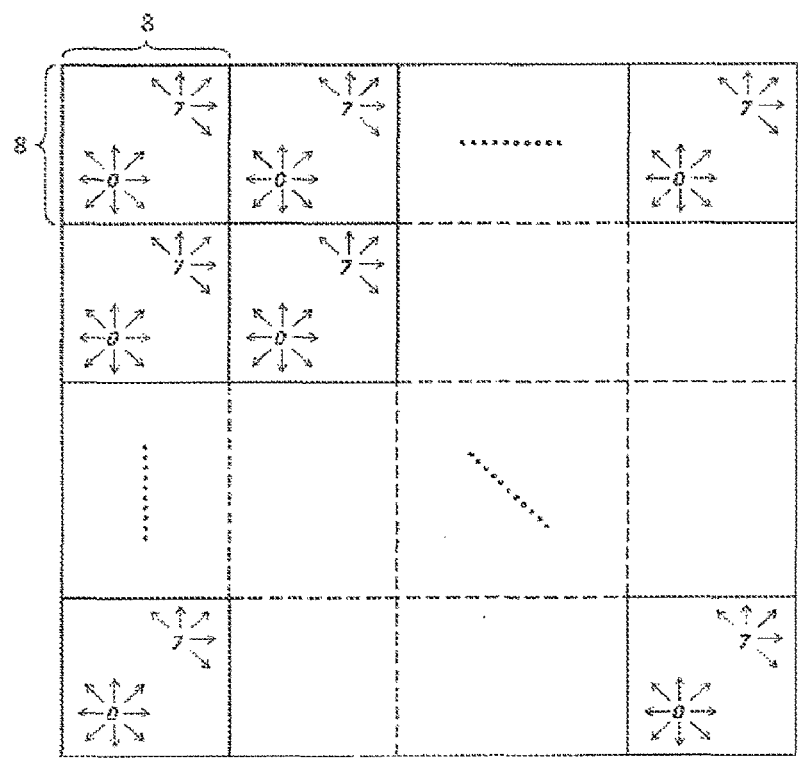
FIG. 2 is exemplary diagram illustrating a grayscale image performed with dot diffusion by using a class matrix.
Figure 3:
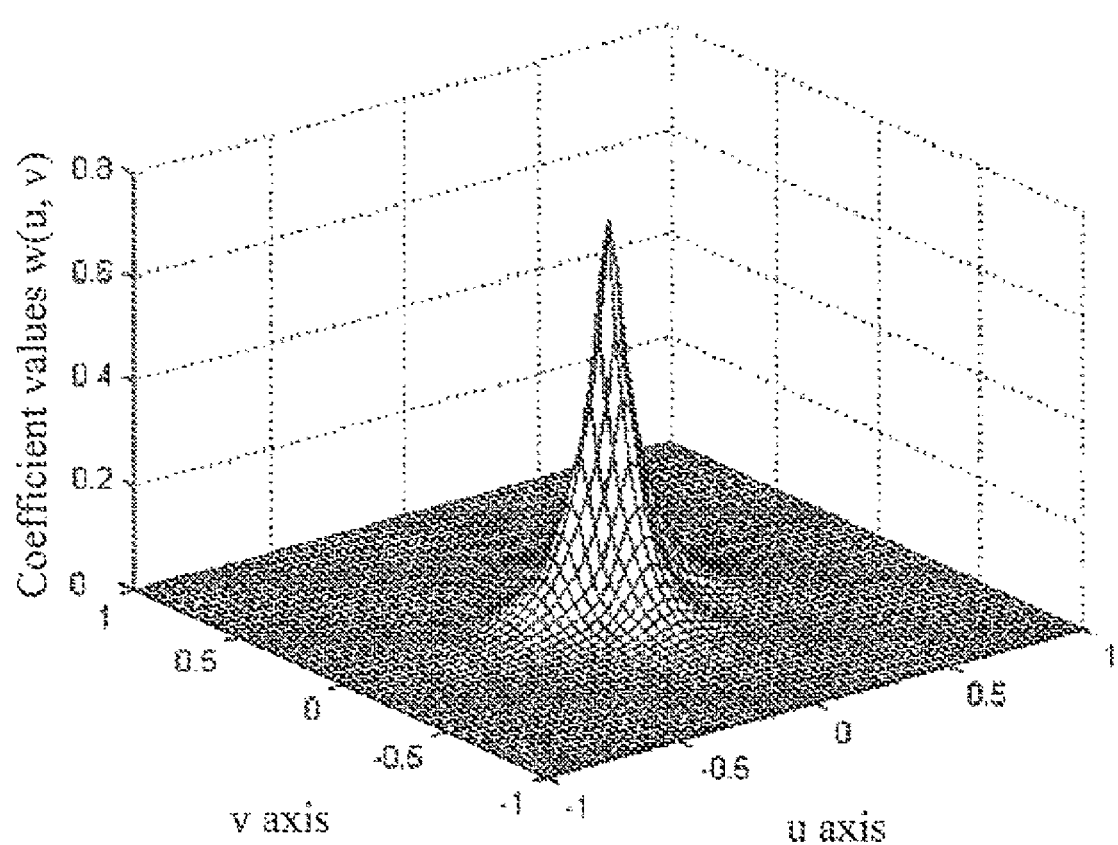
FIG. 3 is diagram showing a shape of HVS equation (in frequency domain) in Mese's method.
Figure 4:
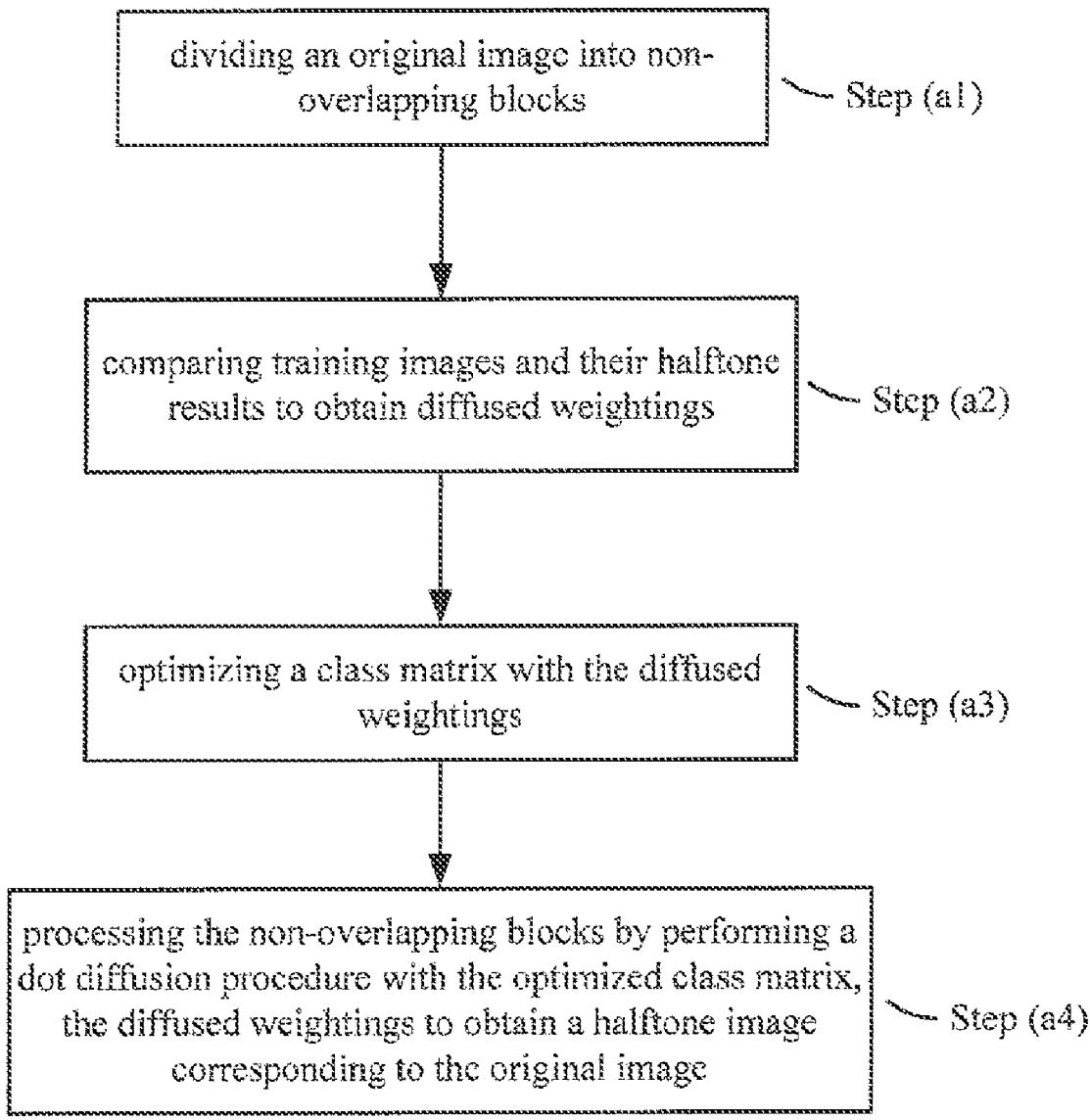
FIG. 4 is a flow chart illustrating a digital halftoning method in accordance with the present invention.

Please refer to FIG. 4. An embodiment of a digital halftoning method according to the present invention will be described. First, an original image is divided into non-overlapping blocks (step (a1)). The non-overlapping blocks is left for processing in step (a4).

In step (a2), a LMS (Least-Mean-Square) filter is obtained by comparing grayscale images and corresponding halftone results of the grayscale images. Those grayscale images are used for training, and thus called training images. A corresponding halftone result of each training image is composed of binary output values, for example 0, 255, and can be obtained from various kinds of halftoning methods, for example, dot diffusion, error diffusion, ordered dithering and direct binary search (DBS). A LMS filter, which has been trained by using the training images and their halftone results, is called a LMS-trained filter. Since the LMS-trained filter has the characteristics of Human Visual System (HVS), the values inside the filter can be taken as diffused weightings and the size of the filter can be taken as a diffused area. Here, the diffused weightings of the LMS-trained filter is obtained by the following equations, $$\hat{x}_{i,j} = \sum_{m,n \in R} \sum w_{m,n} b_{i+m,j+n}, \quad (5)$$

$$e_{i,j}^2 = (x_{i,j} - \hat{x}_{i,j})^2, \quad (6)$$

-continued $$\frac{\partial e_{i,j}^2}{\partial w_{m,n}} = -2e_{i,j} b_{i+m,j+n}, \quad (7)$$

$$\begin{cases} \text{if } w_{m,n} > w_{m,n,opt}, \text{ slope} > 0, w_{m,n} \text{ should be decreased} \\ \text{if } w_{m,n} < w_{m,n,opt}, \text{ slope} < 0, w_{m,n} \text{ should be increased} \end{cases}, \quad (8)$$

$$w_{m,n}^{(k+1)} = w_{m,n}^k + \mu e_{i+m,j+n} b_{i+m,j+n}, \quad (9)$$

where $x_{i,j}$ is a grayscale value of a training image, $b_{i,j}$ is the corresponding halftone result of the training image, $w_{m,n}$ is the diffused weightings, $w_{m,m,opt}$ is an optimum LMS coefficient, $e_{i,j}^2$ is the mean squared error (MSE) between $x_{i,j}$ and $\hat{x}_{i,j}$ and $\mu$ is an adjusting parameter used to control convergent speed of the LMS optimum procedure.

As shown in FIG. 5, four LMS-trained filters of different sizes, 3×3, 5×5, 7×7 and 9×9 are obtained according to the present invention. Table 5 shows the diffused weightings inside the LMS-trained filters of size 3×3. Note that, these LMS-trained filters are all with some basic HVS characteristics: (1) the diagonal has less sensitivity than the vertical and horizontal directions and (2) the center portion has the highest sensitivity and it decreases while moving away from the center.

TABLE 5

| 0.080009 | 0.126664 | 0.075175 |
|----------|----------|----------|
| 0.121144 | x        | 0.118328 |
| 0.079654 | 0.131194 | 0.081044 |

In step (a3), the diffused weightings of the above-mentioned LMS-trained filters are used to optimize a class matrix. In other case of class matrix optimization, for example, it can also use the diffused weightings obtained from psychophysical experiments. Some other filters involving diffused area and diffused weightings can be employed as well.

For the class matrix optimization, it needs to evaluate the quality of a halftone image. The quality of the halftone image can be defined as peak signal-to-noise ratio (PSNR), $$PSNR = 10 \log_{10} \frac{P \times Q \times 255^2}{\sum_{m,n \in R} \sum V_{m,n}(x_{i,j} - b_{i+m,j+n})^2}, \quad (10)$$

where $x_{i,j}$ is a grayscale value of an image, $b_{i,j}$ is the corresponding halftone result, $V_{m,n}$ represents selected diffused weightings inside a Least-Mean-Square trained (LMS-trained) filter at position (m,n), and R is a support region of the LMS-trained filter. Note that, any LMS-trained filter can be selected to participate in the performance evaluation.

To optimize the class matrix, each member in the class matrix is successively swapped with one of the other members and applied to a set of testing images. The quality evaluation approach introduced above is employed to evaluate the average PSNRs of the corresponding dot-diffused halftone images. The average PSNR of the halftone images utilized the class matrix is compared with the average PSNR of the halftone images utilized the swapped class matrix. Only the swapped result with the highest average PSNR will be retained as a new class matrix, and then conducts the same above-mentioned swapping procedure until no further swapping can improve the average PSNR anymore.

Figure 6:
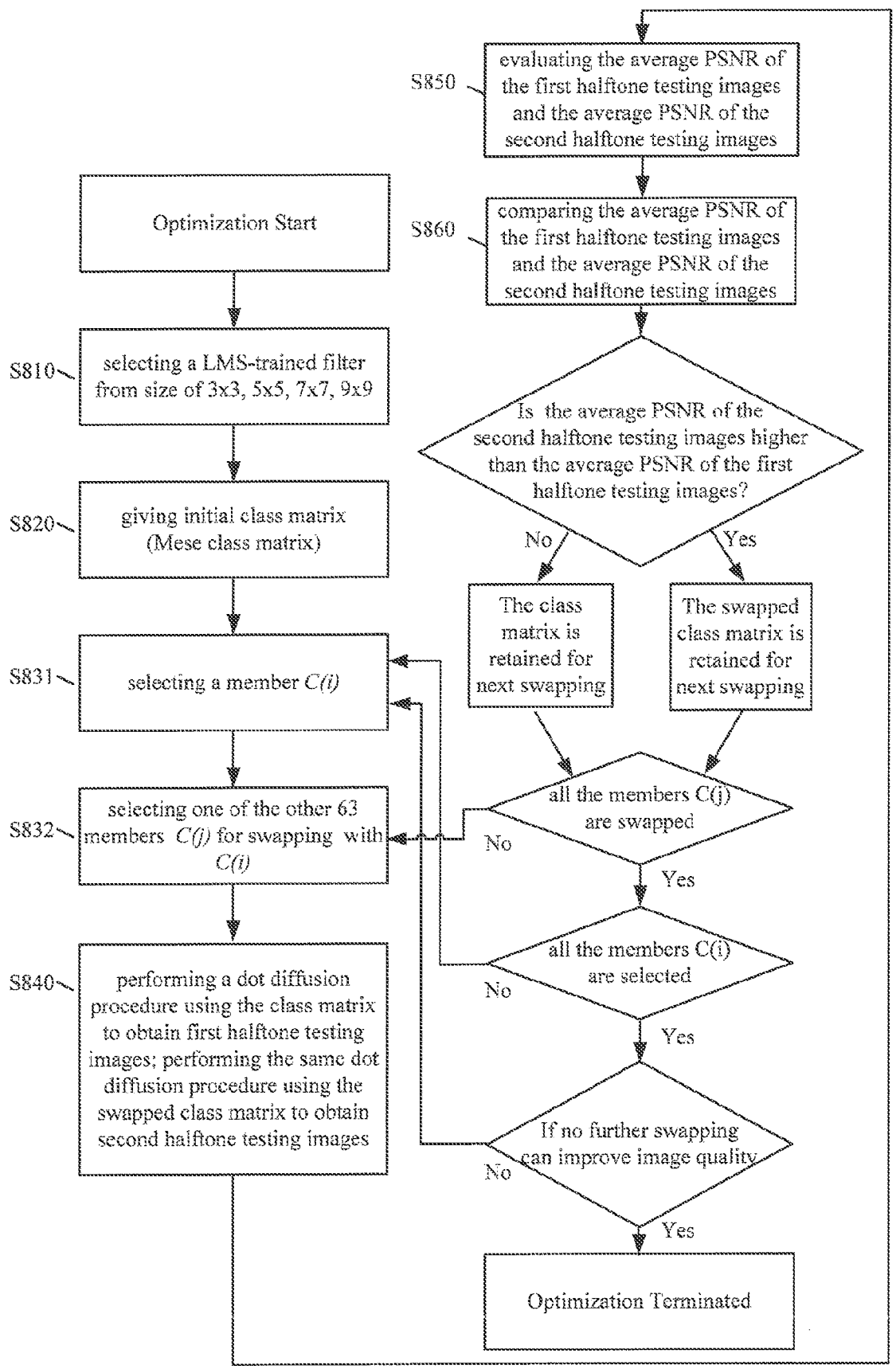
FIG. 6 is a flow chart illustrating a class matrix optimizing method in accordance with the present invention.

Please refer to FIG. 6, which shows a flow chart of an example of class matrix optimization. Suppose a class matrix of size 8×8 is to be optimized.

In step S810, one of LMS-trained filters of sizes 3×3, 5×5, 7×7 and 9×9 is selected, for example, a 3×3 LMS-trained filter is selected. The values inside the LMS-trained filter are taken as diffused weightings and the size of the LMS-trained filter is taken as a diffused area.

In step S820, an initial class matrix is given, for example, Mese's class matrix. The members within the initial class matrix are taken as 1-D sequence.

In step S831, a member $C(i)$ in the class matrix is selected.

In step S832, the member $C(i)$ in the class matrix is swapped with one of the other 63 members $C(j)$, where $i \neq j$.

In step S840, a dot diffusion procedure is performed with the LMS-trained filter selected from step S810 and the class matrix to a set of testing images to obtain corresponding dot-diffused halftone testing images, which may called a first halftone testing images. Similarly, the same dot diffusion procedure is performed with the LMS-trained filter and the swapped class matrix to those testing images to obtain corresponding halftone testing images, which may called a second halftone testing images. The testing images can be any natural images. Any grayscale images with various kinds of grayscale values can be adopt for serving as the testing images.

In step S850, the average PSNR of the first halftone testing images and the average PSNR of the second halftone testing images are evaluated.

In step S860, the average PSNR of the first halftone testing images and the average PSNR of the second halftone testing images are compared to determine whether the swapped class matrix leads to the highest reconstructed image quality. If so, the swapped class matrix is taken as a new class matrix. Otherwise, the class matrix is used for above-mentioned swapping procedures.

If not all the members $C(j)$ in the class matrix are swapped with the member $C(i)$, it will go to step S832 for swapping another member $C(j)$. After all the members $C(j)$ have been swapped with the member $C(i)$, another member $C(i)$ is selected to swap. If not all the members $C(i)$ are selected, it will go to step S831 for swapping another member $C(i)$ that has not been selected. If no further swapping can improve the quality of the reconstructed dot-diffused image, the optimization procedure is terminated and an optimized class matrix is thus determined. Otherwise, step S831 to step S860 are iteratively performed.

Figure 7:
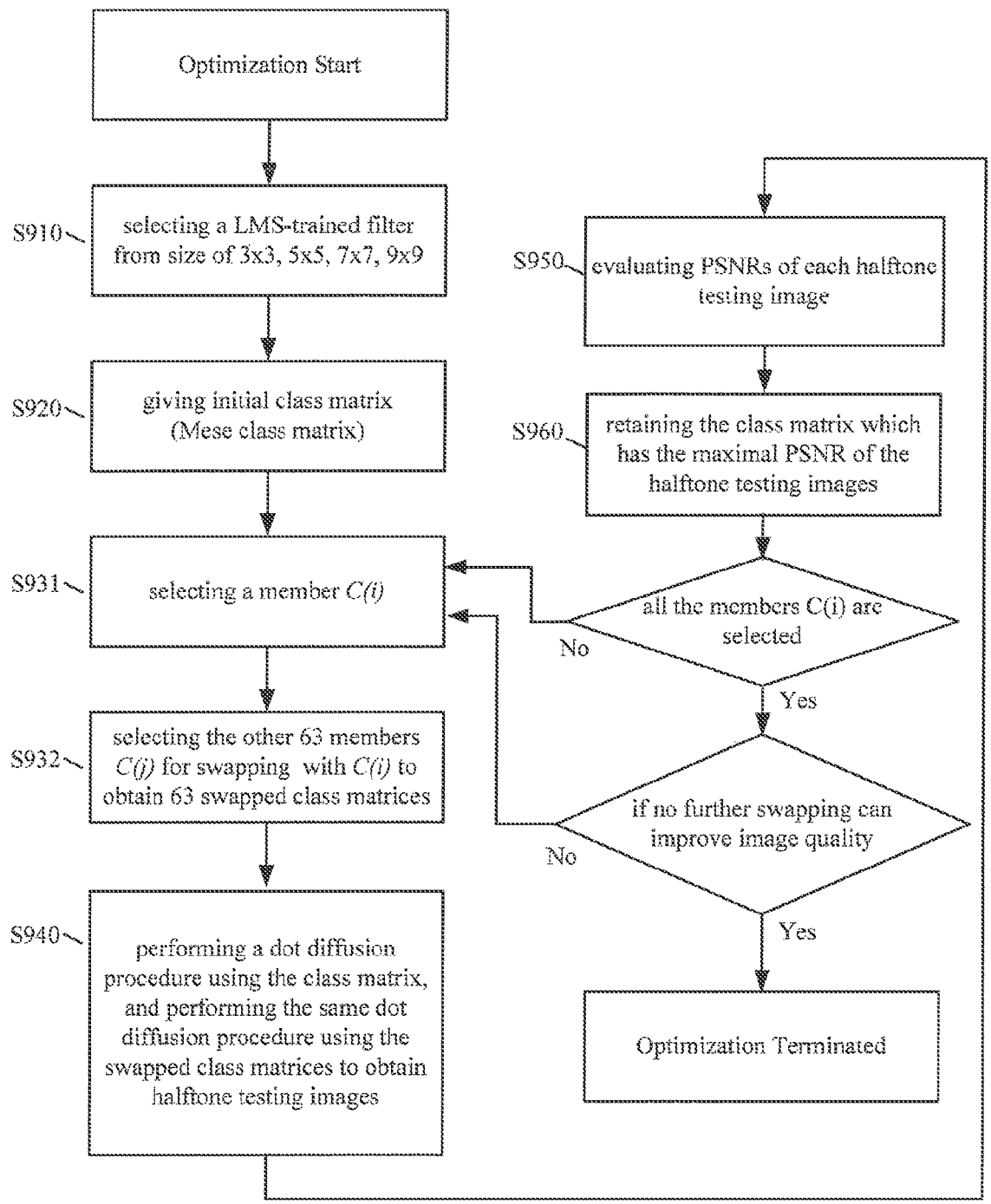
FIG. 7 is a flow chart illustrating another class matrix optimizing method in accordance with the present invention.

Please refer to FIG. 7, which shows a flow chart of another example of class matrix optimization. Suppose a class matrix of size 8×8 is to be optimized. Since steps S910, S920, S931 are similar to steps S810, S820, S831 in FIG. 6, the description of steps S910, S920, S931 will be omitted herein for clear and concise description.

In step S932, the member $C(i)$ in the class matrix is swapped with the other 63 members $C(j)$, where $i \neq j$. Thus, 63 swapped class matrices are obtained.

In step S940, a dot diffusion procedure is performed with the LMS-trained filter selected from step S910 and the class matrix, and the same dot diffusion procedure is performed with the LMS-trained filter and the swapped class matrices to a testing image to obtain corresponding dot-diffused halftone testing images. The dot diffusion procedure may be performed to a set of testing images. Here, one testing image is taken for an example.

In step S950, PSNRs of each halftone testing image are evaluated. There are 64 PSNR results corresponding to 64 halftone testing images, where one halftone testing images obtained by using the class matrix and 63 halftone testing images obtained by respectively using the 63 swapped class matrices.

In step S960, the class matrix which has the maximal PSNR of the halftone testing images is retained. The class matrix which has the maximal PSNR leads to the highest reconstructed image quality and then is taken as a new class matrix.

If not all the members $C(i)$ are selected, it will go to step S931 for swapping another member $C(i)$ that has not been selected. In the meanwhile, the class matrix which has the maximal PSNR obtained from step S960 is taken as a new class matrix for swapping another member $C(i)$. If no further swapping can improve the quality of the reconstructed dot-diffused image, the optimization procedure is terminated and an optimized class matrix is thus determined.

Some of the final convergent class matrices associate to different diffused weightings and diffused areas are shown in Table 6(a)-(d) and Table 7.

TABLE 6(a)

8 × 8 class matrix using diffused area of size 3 × 3

| 29 | 16 | 58 | 10 | 51 | 18 | 41 | 15 |
|---|---|---|---|---|---|---|---|
| 57 | 63 | 42 | 6 | 14 | 44 | 21 | 45 |
| 34 | 0 | 62 | 30 | 26 | 5 | 46 | 37 |
| 32 | 23 | 24 | 60 | 2 | 4 | 47 | 12 |
| 7 | 19 | 25 | 11 | 54 | 52 | 48 | 43 |
| 49 | 17 | 36 | 20 | 8 | 9 | 61 | 59 |
| 28 | 40 | 39 | 31 | 3 | 35 | 56 | 27 |
| 1 | 33 | 50 | 22 | 53 | 55 | 38 | 13 |

TABLE 6(b)

8 × 8 class matrix using diffused area of size 5 × 5

| 8 | 22 | 53 | 16 | 44 | 9 | 58 | 51 |
|---|---|---|---|---|---|---|---|
| 15 | 54 | 5 | 20 | 45 | 33 | 32 | 35 |
| 57 | 30 | 24 | 29 | 41 | 39 | 46 | 3 |
| 13 | 31 | 63 | 56 | 4 | 18 | 49 | 2 |
| 14 | 25 | 38 | 0 | 55 | 40 | 52 | 59 |
| 11 | 7 | 6 | 47 | 26 | 17 | 61 | 60 |
| 28 | 43 | 27 | 34 | 36 | 23 | 12 | 10 |
| 37 | 48 | 50 | 1 | 42 | 21 | 62 | 19 |

TABLE 6(c)

8 × 8 class matrix using diffused area of size 7 × 7

| 8 | 11 | 44 | 43 | 7 | 62 | 48 | 19 |
|---|---|---|---|---|---|---|---|
| 61 | 58 | 1 | 29 | 24 | 59 | 49 | 20 |
| 25 | 33 | 31 | 56 | 10 | 42 | 4 | 28 |
| 23 | 36 | 21 | 55 | 13 | 40 | 35 | 6 |
| 3 | 38 | 0 | 54 | 32 | 5 | 53 | 63 |
| 26 | 15 | 12 | 52 | 34 | 16 | 57 | 60 |
| 45 | 46 | 39 | 51 | 41 | 27 | 17 | 14 |
| 30 | 22 | 50 | 9 | 18 | 2 | 47 | 37 |

TABLE 6(d)

8 × 8 class matrix using diffused area of size 9 × 9

| 8 | 63 | 57 | 55 | 31 | 2 | 38 | 23 |
|---|---|---|---|---|---|---|---|
| 24 | 25 | 36 | 39 | 11 | 44 | 45 | 46 |
| 47 | 0 | 54 | 4 | 14 | 37 | 35 | 3 |

TABLE 6(d)-continued

8 × 8 class matrix using
diffused area of size 9 × 9

| 56 | 30 | 51 | 15 | 42 | 40 | 33 | 16 |
|----|----|----|----|----|----|----|----|
| 58 | 20 | 50 | 18 | 5  | 49 | 52 | 17 |
| 6  | 9  | 34 | 32 | 27 | 10 | 21 | 59 |
| 28 | 43 | 13 | 19 | 48 | 22 | 60 | 29 |
| 62 | 53 | 1  | 26 | 41 | 7  | 61 | 12 |

TABLE 7

16 × 16 class matrix using diffused area of size 3 × 3

| 200 | 0   | 5   | 22  | 51  | 55  | 33  | 119 | 54  | 91  | 71  | 160 | 169 | 123 | 168 | 188 |
|-----|-----|-----|-----|-----|-----|-----|-----|-----|-----|-----|-----|-----|-----|-----|-----|
| 3   | 6   | 23  | 36  | 60  | 50  | 74  | 115 | 140 | 82  | 147 | 164 | 171 | 142 | 220 | 214 |
| 14  | 7   | 42  | 16  | 63  | 52  | 94  | 56  | 133 | 152 | 162 | 177 | 179 | 208 | 222 | 1   |
| 15  | 26  | 43  | 75  | 79  | 84  | 148 | 81  | 139 | 136 | 166 | 102 | 217 | 219 | 226 | 4   |
| 17  | 39  | 72  | 92  | 103 | 108 | 150 | 135 | 157 | 193 | 192 | 100 | 223 | 225 | 227 | 13  |
| 28  | 111 | 99  | 87  | 116 | 131 | 167 | 112 | 180 | 196 | 181 | 224 | 233 | 228 | 12  | 21  |
| 47  | 120 | 69  | 105 | 125 | 132 | 172 | 183 | 184 | 205 | 175 | 232 | 245 | 8   | 20  | 41  |
| 76  | 65  | 129 | 137 | 165 | 145 | 178 | 194 | 206 | 170 | 229 | 244 | 246 | 19  | 24  | 49  |
| 80  | 73  | 106 | 138 | 176 | 182 | 174 | 197 | 218 | 235 | 242 | 249 | 247 | 18  | 48  | 68  |
| 101 | 107 | 134 | 153 | 185 | 163 | 202 | 173 | 231 | 241 | 248 | 253 | 44  | 88  | 70  | 45  |
| 110 | 141 | 149 | 61  | 195 | 204 | 221 | 234 | 240 | 243 | 254 | 38  | 46  | 77  | 104 | 109 |
| 85  | 96  | 156 | 130 | 203 | 215 | 230 | 250 | 251 | 252 | 255 | 53  | 62  | 93  | 86  | 117 |
| 151 | 155 | 189 | 207 | 201 | 216 | 236 | 239 | 25  | 31  | 34  | 113 | 83  | 95  | 124 | 114 |
| 144 | 146 | 191 | 209 | 213 | 237 | 238 | 29  | 32  | 59  | 64  | 97  | 118 | 78  | 128 | 159 |
| 187 | 190 | 198 | 212 | 9   | 10  | 30  | 35  | 58  | 67  | 90  | 40  | 122 | 127 | 154 | 161 |
| 199 | 210 | 211 | 2   | 11  | 27  | 37  | 57  | 66  | 89  | 98  | 121 | 126 | 143 | 158 | 186 |

In step (a4), the non-overlapping blocks (mentioned in step (a1)) is processed by performing a dot diffusion procedure with the optimized class matrix (obtained from step (a3)) and the diffused weightings of the diffused area (obtained from step (a2)) to obtain a halftone image corresponding to the original image.

Figure 8:
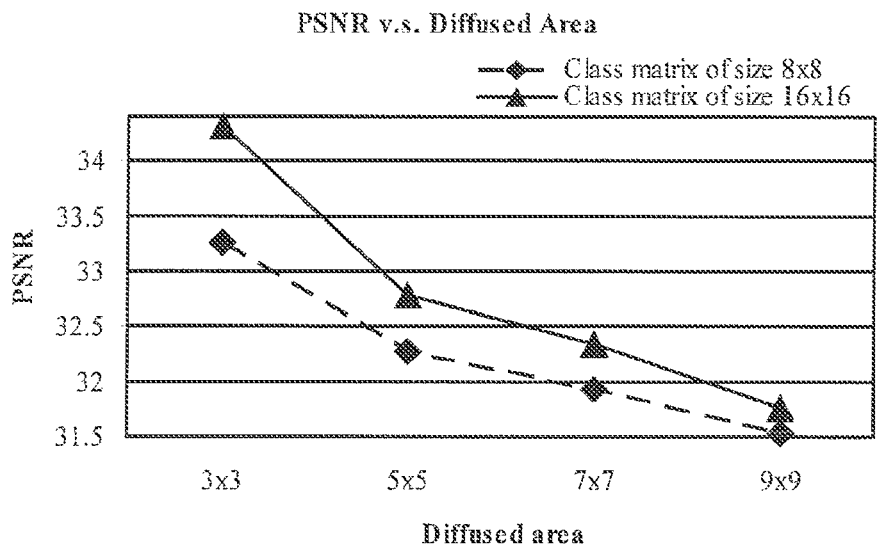
FIG. 8 is a chart showing PSNRs versus class matrices derived from different diffused area in accordance with experimental results of the present invention.

While dealing with the experimental results according to the present invention, the above-mentioned Eq. (10) is adopted for evaluating PSNR, where the LMS-trained filter of size 7×7 as shown in FIG. 5(c) is participated in the performance evaluation. The PSNR versus the class matrices derived from different diffused area are shown in FIG. 8. It is clear that the halftone image quality decreases as the size of the diffused area increasing. Hence, in the present invention, the class matrices optimized by the LMS-trained filter of size 3×3 as shown in Table 6(a) and Table 7 are most appropriately employed for dot diffusion.

Figure 9:
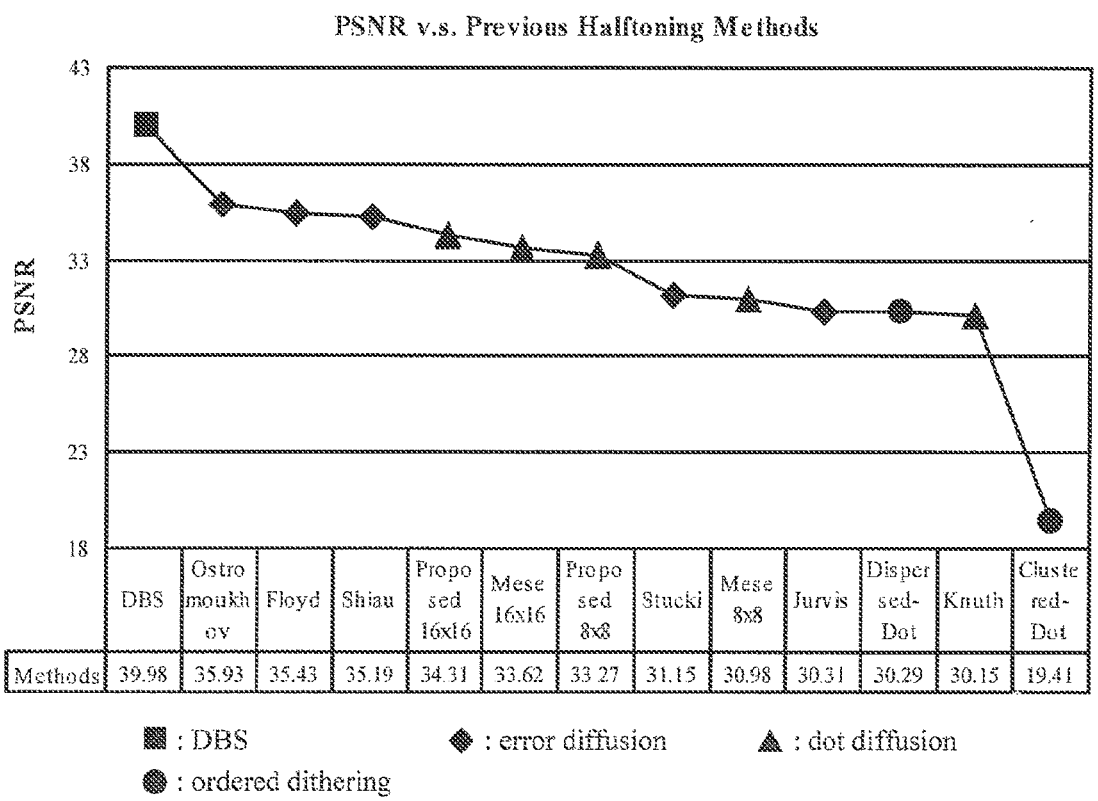
FIG. 9 is a chart showing a comparison of prior methods and a digital halftoning method according to the present invention.

FIG. 9 shows PSNRs obtained from 13 various halftoning methods, including error diffusion by Floyd (PSNR=35.4), Jarvis (PSNR=30.3), Stucki (PSNR=31.1), Ostromoukhov (PSNR=35.9) and Shiau (PSNR=35.1); dot diffusion by Knuth (PSNR=30.1) and Mese (PSNR=33.6 for 16×16 class matrix, PSNR=30.9 for 8×8 class matrix); ordered dithering with Classical-4 clustered-dot dithering (PSNR=19.4) and Bayer-5 dispersed-dot dithering (PSNR=30.2); and DBS (PSNR=39.9). According to the experimental results, it is clear that the halftoning method utilizing dot diffusion according to the present invention (PSNR=34.3 for 16×16 class matrix, PSNR=33.2 for 8×8 class matrix) has better halftone image quality than Mese's method. Specifically speaking, the PSNR by using the proposed 8×8 class matrix according to the present invention is superior to Mese's 8×8 class matrix, and the proposed 16×16 is superior to Mese's 16×16. In addition, the halftoning method of the present invention has close image quality to error diffusion and far better than ordered dithering. Although the quality is still a bit lower than some error diffusion and DBS, the parallel processing nature is still an attractive advantage comparing to error diffusion or iteration-based DBS.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A digital halftoning method, the method comprising steps of:
   (a1) dividing an original image into non-overlapping blocks;
   (a2) comparing at least a training image and a halftone result corresponding to the training image to obtain diffused weightings of a diffused area;
   (a3) optimizing a class matrix with the diffused weightings of the diffused area to obtain an optimized class matrix; and
   (a4) processing the non-overlapping blocks by performing a dot diffusion procedure with the optimized class matrix and the diffused weightings to generate a halftone image corresponding to the original image.

2. The method of claim 1, wherein the halftone result of the training image is obtained by an approach selected from a group consisting of dot diffusion, error diffusion, ordered dithering and direct binary search (DBS).

3. The method of claim 1, wherein in step (a2), the diffused weightings are obtained by following equations:

$$\hat{x}_{i,j} = \sum_{m,n \in R} \sum w_{m,n} b_{i+m,j+n},$$

$$e_{i,j}^2 = (x_{i,j} - \hat{x}_{i,j})^2,$$

$$\frac{\partial e_{i,j}^2}{\partial w_{m,n}} = -2e_{i,j} b_{i+m,j+n},$$

$$\begin{cases} \text{if } w_{m,n} > w_{m,n,opt}, \text{ slope} > 0, w_{m,n} \text{ should be decreased} \\ \text{if } w_{m,n} < w_{m,n,opt}, \text{ slope} < 0, w_{m,n} \text{ should be increased} \end{cases},$$

-continued $$w_{m,n}^{(k+1)} = w_{m,n}^k + \mu e_{i+m,j+n} b_{i+m,j+n},$$

where $x_{i,j}$ is a grayscale value of the training image, $b_{i,j}$ is the corresponding halftone result of the training image, $w_{m,n}$ is the diffused weightings, $w_{m,m,opt}$ is an optimum coefficient, $e_{i,j}^2$ is a mean squared error (MSE) between $x_{i,j}$ and $\hat{x}_{i,j}$, and $\mu$ is an adjusting parameter used to control convergent speed.

4. The method of claim 1, wherein the step (a3) comprises swapping one member of the class matrix with one of the other members to obtain a swapped class matrix.

5. The method of claim 4, wherein the step (a3) comprises retaining the swapped class matrix if the swapped class matrix leads to higher reconstructed image quality than the class matrix.

6. The method of claim 4, wherein the step (a3) comprises retaining the class matrix if the class matrix leads to higher reconstructed image quality than the swapped class matrix.

7. The method of claim 1, wherein in step (a4), the non-overlapping blocks are processed in parallel.

8. The method of claim 1, wherein the step (a3) comprises sub-steps of:
   (b1) selecting a member of the class matrix;
   (b2) swapping the selected member of the class matrix with the other members to obtain a plurality of swapped class matrices;
   (b3) performing a dot diffusion procedure with the diffused weightings of the diffused area and the class matrix, and performing the same dot diffusion procedure with the diffused weightings of the diffused area and the swapped class matrices to at least a testing image to obtain corresponding halftone testing images;
   (b4) evaluating peak signal-to-noise ratios (PSNRs) of each halftone testing image; and
   (b5) retaining the class matrix which has the maximal PSNR of the halftone testing images.

9. A method for optimizing a class matrix, the method comprising steps of:
   (c1) selecting a member of the class matrix;
   (c2) swapping the selected member of the class matrix with one of the other members;
   (c3) performing a dot diffusion procedure with the class matrix to at least a testing image to obtain a first halftone testing image and performing the same dot diffusion procedure with the swapped class matrix obtained from the swapping step (c2) to the testing image to obtain a second halftone testing image;
   (c4) comparing a peak signal-to-noise ratio (PSNR) of the first halftone testing image and a PSNR of the second halftone testing image to obtain a comparing result; and
   (c5) determining an optimized class matrix according to the comparing result.

10. The method of claim 9, wherein before step (c4), further comprising evaluating the PSNR of the first halftone testing image and the PSNR of the second halftone testing image.

11. The method of claim 10, wherein the PSNR of any of the first and second halftone testing image is evaluated with an equation:

$$PSNR = 10\log_{10}\frac{P \times Q \times 255^2}{\sum_{m,n \in R}\sum V_{m,n}(x_{i,j} - b_{i+m,j+n})^2},$$

where $x_{i,j}$ is a grayscale value of the testing image, $b_{i,j}$ is corresponding first (or second) halftone result of the testing image, $V_{m,n}$ represents selected diffused weightings inside a Least-Mean-Square trained (LMS-trained) filter at position (m,n), and R is a support region of the LMS-trained filter.

12. The method of claim 9, wherein the step (c4) comprises retaining the swapped class matrix if the PSNR of the second halftone testing image is higher than the PSNR of the first halftone testing image.

13. The method of claim 9, wherein the step (c4) comprises retaining the class matrix if the PSNR of the first halftone testing image is higher than the PSNR of the second halftone testing image.

14. The method of claim 9, wherein step (c2) to step (c4) are repeated.

15. The method of claim 9, wherein step (c1) to step (c4) are repeated.

16. A method for optimizing a class matrix, the method comprising steps of:
   (d1) selecting a member of the class matrix;
   (d2) swapping the selected member of the class matrix with the other members to obtain a plurality of swapped class matrices;
   (d3) performing a dot diffusion procedure with diffused weightings of a diffused area and the class matrix, and performing the same dot diffusion procedure with the diffused weightings of the diffused area and the swapped class matrices to at least a testing image to obtain corresponding halftone testing images;
   (d4) evaluating peak signal-to-noise ratios (PSNRs) of each halftone testing image; and
   (d5) retaining the class matrix which has the maximal PSNR of the halftone testing images.

17. The method of claim 16, wherein the PSNR of any of the halftone testing images is evaluated with an equation:

$$PSNR = 10\log_{10}\frac{P \times Q \times 255^2}{\sum_{m,n \in R}\sum V_{m,n}(x_{i,j} - b_{i+m,j+n})^2},$$

where $x_{i,j}$ is a grayscale value of the testing image, $b_{i,j}$ is corresponding halftone result of the testing image, $V_{m,n}$ represents selected diffused weightings inside a Least-Mean-Square trained (LMS-trained) filter at position (m,n), and R is a support region of the LMS-trained filter.

* * * * *